(12) United States Patent
Li (10) Patent No.: US 9,792,617 B2
(45) Date of Patent: Oct. 17, 2017

(54) SYSTEMS AND METHODS FOR GENERATING SURVEYS

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 0 days.

(21) Appl. No.: 15/279,433

(22) Filed: Sep. 29, 2016

(65) Prior Publication Data

US 2017/0017974 A1 Jan. 19, 2017

Related U.S. Application Data

(63) Continuation-in-part of application No. 14/194,793, filed on Mar. 2, 2014, now Pat. No. 9,483,774.

(51) Int. Cl.
*G06Q 30/02* (2012.01)
(52) U.S. Cl.
CPC ................................ *G06Q 30/0203* (2013.01)
(58) Field of Classification Search
CPC ........................ G06C 30/0203; G06F 3/048
See application file for complete search history.

(56) References Cited

U.S. PATENT DOCUMENTS

| 5,893,098 A * | 4/1999 | Peters .................... G06Q 30/02 |
| 2010/0177876 A1* | 7/2010 | Perrella ................. H04M 7/003 379/88.04 |
| 2012/0095796 A1* | 4/2012 | Gately ............. G06Q 10/06311 705/7.13 |
| 2014/0193794 A1* | 7/2014 | Olander, III ............. G09B 7/06 434/362 |

* cited by examiner

*Primary Examiner* — Jermele M Hollington
*Assistant Examiner* — Zannatul Ferdous (57) ABSTRACT

Embodiments introduced describe single-action surveys, wherein a survey requires a single action only, such as a click on a computer mouse, a tap or stroke on a touch screen. Each single action means submission of one survey answer and a survey session may end after a single action is performed. In addition, a survey may contain a single question only and a single question may concern user satisfaction or contain a few words or even one word.

20 Claims, 9 Drawing Sheets

FIG. 14

SYSTEMS AND METHODS FOR GENERATING SURVEYS

CROSS REFERENCE TO RELATED APPLICATION

This is a continuation-in-part of Ser. No. 14/194,793, filed Mar. 2, 2014, now U.S. Pat. No. 9,483,774, granted Nov. 1, 2016.

FEDERALLY SPONSORED RESEARCH

Not applicable

SEQUENCE LISTING OR PROGRAM

Not applicable

BACKGROUND

Field of Invention

This invention relates to generating surveys, more particularly to generating quick and less intrusive surveys.

Description of Prior Art

Surveys on customer satisfaction are important for business. Surveys on social or political issues are important for the society and politics. Survey results benefit business owners, policy makers as well as the general public. For example for a business, surveys may be used to monitor customer service, improve product quality, detect defects, observe future trends, etc. Traditional surveys use a questionnaire that has many questions on several pages. The questions are often long and take time to comprehend. In addition, surveys often show up as an unwelcome surprise. Hence, no matter whether a questionnaire is on paper or on a screen, most people usually just shy away from it because, it is considered time consuming, burdensome and intrusive. In many cases, even the allure of raffle prize won't make people answer survey questions.

Therefore, there exists a need for a survey which is quick, easy, and less intrusive.

OBJECTS AND ADVANTAGES

Accordingly, several main objects and advantages of the present invention are:

a). to provide an improved system and method to generate or conduct a survey;
b). to provide such a survey which is quick, simple, convenient, and less intrusive;
c). to provide such a survey which requires a single action only;
d). to provide such a survey where a single action includes simple and easy moves, such as a click, touch, stroke, motion, or short verbal reply;
e). to provide such a survey which contains a single question;
f). to provide such a survey where a single question concerns user satisfaction; and
g). to provide such a survey where a single question has one or a few words only.

Further objects and advantages will become apparent from a consideration of the drawings and ensuing description.

SUMMARY

In accordance with the present invention, a survey is designed which may need a single action only. A survey session may begin within a given period of time after a target event is completed. A survey may involve just one action, such as a touch, a click, a slide, a motion, or a short verbal response. Each single action may provide a specific survey answer and conclude a survey in the meantime. A survey may present a single question which is about user satisfaction or has one or a few words only. In addition, a survey session may be prolonged or postponed to a later time when a user chooses to do so. If no action is taken, the session may end automatically within a sufficiently short period of time, making it less intrusive. The survey process is brief, simple, convenient, and less troublesome compared to completing a traditional questionnaire. As a result, participation of such surveys may be more likely than before.

DRAWING FIGURES

FIGS. 7-A, 7-B, and 8 are illustrations of embodiments in accordance with the present invention.

---

REFERENCE NUMERALS IN DRAWINGS

| | | | |
|---|---|---|---|
| 10 | Client System | 12 | Survey Database |
| 14 | Communication Network | 16 | Processor |
| 18 | Processing Module | 20 | Log Database |
| 22 | Computer Readable Medium | | |
| 24 | Message | 26 | Survey Subject |
| 28 | Graphic Object | 30 | Graphic Object |
| 31 | Message | 32 | Graphic Object |
| 33 | Graphic Button | 34 | Survey Icon |
| 35 | Graphic Button | 36 | Display Surface |
| 38 | Area | 40 | Comment Pad |
| 42 | Button | 44 | Button |
| 46 | Button | 48 | Display |
| 50 | Client System | 52 | Keypad |
| 54 | Display Surface | 56 | Graphic Object |
| 58 | Graphic Object | 60 | Graphic Object |
| 62 | Survey Icon | 64 | Survey Window |
| 66 | Client System | 68 | Client System |
| 70 | Survey Window | 72 | Display Surface |
| 74 | Speaker | 76 | Microphone |
| 78 | Client System | 80 | Client System |
| 82 | Server System | 84 | Hand |
| 86 | Check Mark | 90 | Graphic Button |
| 92 | Graphic Button | 93 | Graphic Button |
| 94 | Graphic Button | 95 | Graphic Button |
| 96 | Graphic Button | 97 | Graphic Button |
| 98 | Graphic Button | | |

100, 102, 104, 106, 107, 108, 110, 112, 114, 116, 117, 118, 120, 122, 124, 128, 130, 132, 134, 136, 138, 140, 142, 144, 150, 152, 154, 156, 158, 160, 162, 164, 166, 168, 170, and 172 are exemplary steps.

DETAILED DESCRIPTION

Figure 1:
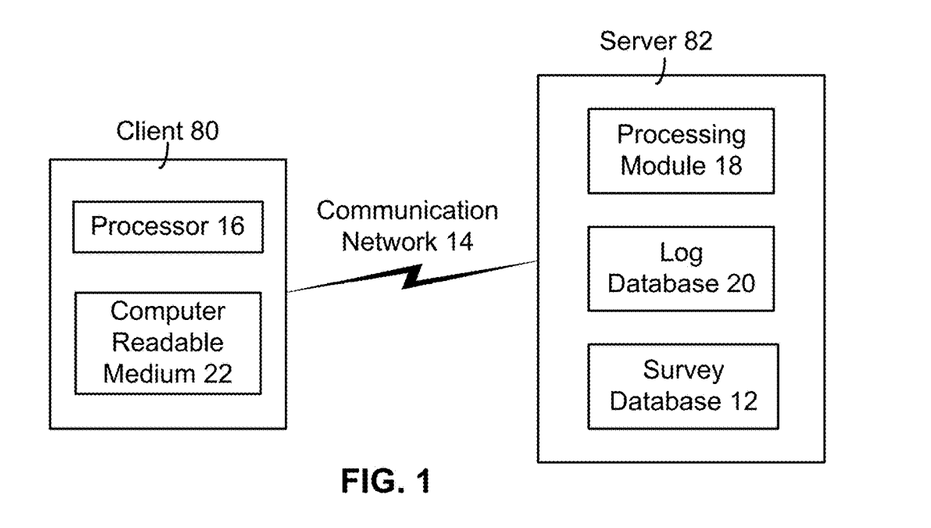
FIG. 1 is a block diagram describing one embodiment in accordance with the present invention.

FIG. 1 is an exemplary block diagram of one embodiment according to the present invention. A client system 80 and server system 82 are connected via a communication network 14. Client 80 may represent an electronic device, including but not limited to a desktop computer, a handheld computer, a tablet computer, a wireless gadget (such as mobile phone, smartphone, smart watch, media player, personal digital assistant (PDA), and the like), digital television (DTV), internet protocol television (IPTV), play station, etc. Client 80 may include a processor 16 and computer readable medium 22. Processor 16 may mean one or more processor chips or systems. Medium 22 may include a memory hierarchy built by one or more memory chips or storage modules like RAM, ROM, FLASH, magnetic, optical and/or thermal storage devices. Processor 16 may run programs or sets of executable instructions stored in medium 22 for performing various functions and tasks, e.g., playing video or music, sending messages, surfing on the Internet, electronic payment, single-action survey, games, etc. Client 80 may also include input, output, and communication components, which may be individual modules or integrated with processor 16. Usually, client 80 has a display with a graphical user interface (GUI). The display surface may also be sensitive to touches, especially in the case of tablet computer, smart phone, and smart watch. Client 80 may also have a voice recognition component to receive audio input from a user.

The word "server" means a system or systems which may have similar functions and capacities as one or more servers. Main components of server may include one or more processors, which control and process data and information by executing software, logic, code, or carrying out any other suitable functions. A server, as a computing device, may include any hardware, firmware, software, or a combination. In the most compact form, a server may be built on a single processor chip. In the figure, server 82 may represent one or more server entities that collect, process, maintain, and/or manage survey information and documents, help conduct surveys, communicate with users, deliver information required by users, etc. Server 82 may exemplarily be divided into three blocks, represented by a processing module 18, a log database 20, and a survey database 12. Processing module 18 may include processing and communication functions. Log database 20 may store user ID information and survey ID information, which may be used to trace a survey result a user provided. Survey database 12 may store survey results and other survey related information, such as background information on survey events. Database 12 and 20 may include aforementioned memory chips and/or storage modules.

A communication network 14 may cover a range of entities such as the Internet or the World Wide Web, a local area network (LAN), a wide area network (WAN), a metropolitan area network (MAN), a telephone network, an intranet, wireless, and other types of networks. Client 80 and server 82 may be connected to network 14 by various wired, wireless, optical, or other connections.

Figure 2:
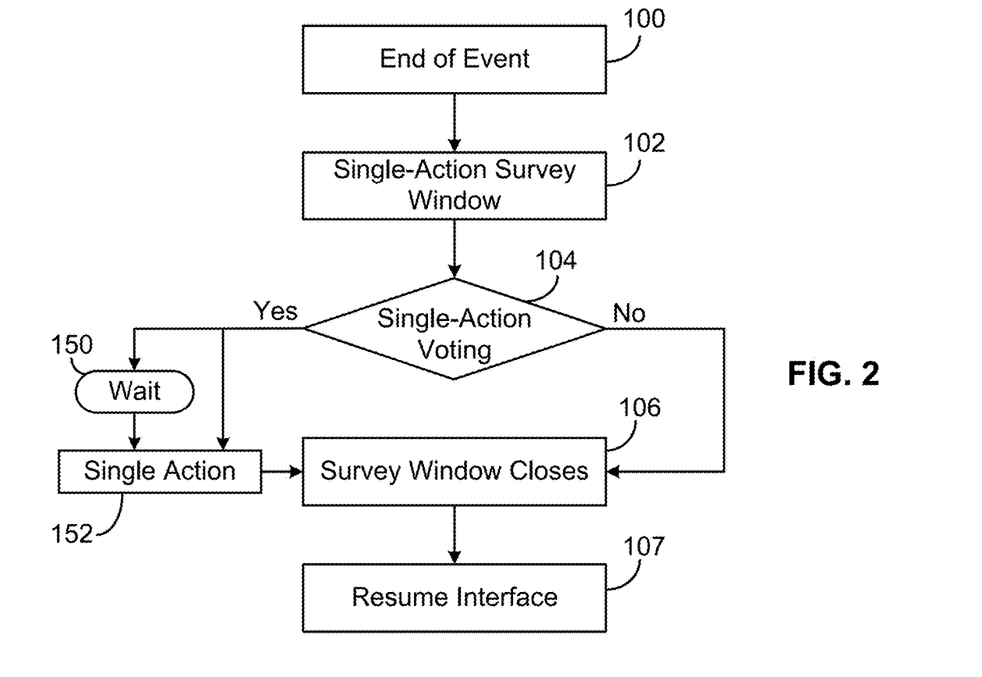
FIG. 2 is a flow diagram showing single-action survey of one embodiment in accordance with the present invention.
Figure 3:
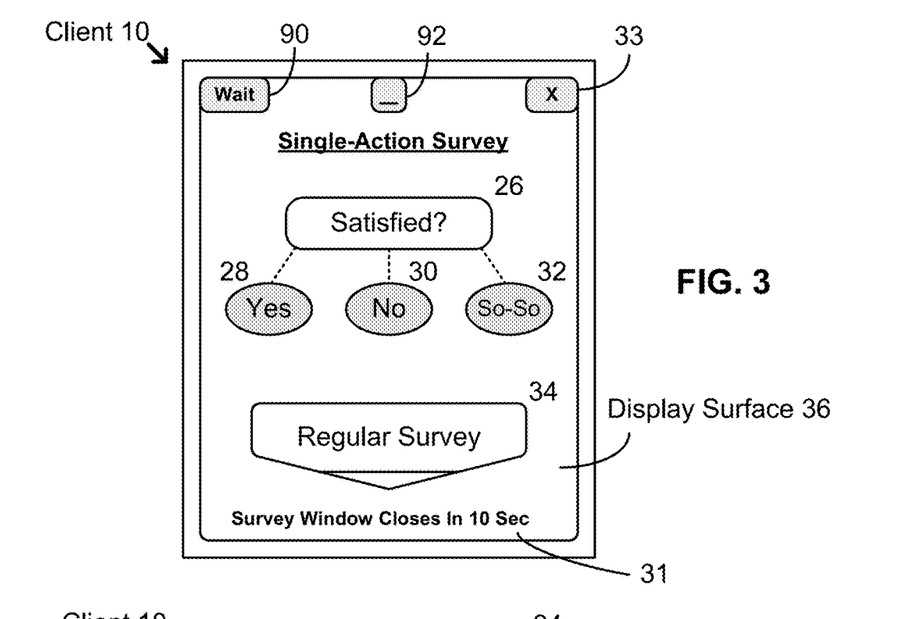
FIGS. 3 and 4 are illustrations of one embodiment in accordance with the present invention.

FIG. 2 is a schematic flow diagram showing one embodiment of single-action survey according to the present invention. FIG. 3 is an exemplary diagram of a client system 10 that may be used to illustrate the flow diagram of FIG. 2. Client 10 has a display surface 36, where messages and graphic objects or icons may be presented. Graphic objects may represent documents, applications, and functions, e.g., a textual file, photo album, browser, email, music, etc. Display surface 36 is also a GUI by which a user may interact with the client system and/or a remote server. Surface 36 may be a touch screen or touchscreen, which is sensitive to a touch or touches. A graphic object on the GUI of a touch screen may be selected or activated by a click on a mouse or more conveniently, by a touch or tap of finger tip.

Returning to FIG. 2. Step 100 represents the end of a target event. The event may be business-related transaction on line or in a retail store, or a process related to other activities. Examples of event include online shopping, in-store shopping, dining, service, gaming, show, sport, community meeting, political gathering, and so on. Next in Step 102, a survey window shows up, which may be depicted exemplarily by FIG. 3. The view on surface 36 of FIG. 3 may be considered as a survey window, where a title says "Single-Action Survey" and a graphic object 26 indicates the survey subject is "Satisfied?". In practice, the title may be rewritten as "Survey on Fast Burger" if assuming a user just made a purchase at eatery Fast Burger. Below object 26, there are objects 28, 30, and 32, corresponding to "Yes" (satisfied), "No" (not satisfied), and "So-So" (average) respectively. The three objects represent three answers for a single-action survey and are used to illustrate survey process for various embodiments to be discussed. Besides the three answer format, other forms may be arranged as well. For example to achieve enhanced precision, five answers may be used which may be very good, good, average, bad, and very bad. And there may be seven-answer configuration, too. However, an answer selection process would be more acceptable if it is simple, easy, and straightforward, which is also the essence of single-action survey. In Step 104 "Single-Action Voting", a user may choose to participate or not to participate in a survey. When participating in a survey, a user may start a survey right away in Step 152 or choose to wait for some time in Step 150. When doing Step 152, a user may select one from the three answers, i.e., voting among objects 28, 30, and 32. Selecting an object may be implemented by a click on it using a mouse or a direct touch or tap on it on surface 36 if the surface is touch sensitive. The single-action survey is designed such that selecting any one of objects 28, 30, and 32 results in Step 106, closure of the survey window and ending of the survey. If a user doesn't want to take the survey, he or she may select a "Close" button 33 on the GUI or surface 36 to reach Step 106. Alternatively, if a user doesn't select any object within a sufficiently short period of time, it may be deemed "not participating" and the survey window and survey session will be closed automatically. Finally, Step 107 may show an interface before the survey or other predetermined contents on surface 36.

The above described survey requires only one action, i.e., a click, a touch, or other single actions as discussed in the above and below, or no action. The whole survey process is simple, swift, easy, and less intrusive, and thus more likely to be accepted by users than a traditional survey. For example, when a user purchases a cup of coffee at a coffee shop, a smartphone may be used to pay for it in an electronic payment process. The transaction may be concluded after the user waves the smartphone in front of a cash register. Then a survey window may appear on the smartphone's touch screen or GUI. The user may give a quick touch on the screen, maybe costing one or two seconds. After that, the survey ends, the survey window closes automatically, and the smartphone screen may return to its previous GUI.

Therefore compared to a traditional questionnaire-type survey, a single-action survey is more convenient, takes less time, and thus may be more acceptable by average people. Although single-action surveys have a simple output, for a shop manager, the survey results may still yield important information about product quality and customer service.

Back to FIG. 1, a single-action survey may be executed by processor 16. The launch of survey may be triggered by a monitoring program of the client system that receives the information of event completion, or by instructions sent by an organization which conducts or oversees the event, or a third party which is informed of the event status. The third party may be a local device or a remote system. It is noted that a client system may or may not be involved in a target event. For example, a smartphone may be used for electronic payment and then for a survey after the payment is made. On the other hand, when a credit card is used for payment, and a smartphone is registered with the credit card, the smartphone may receive instructions to start a survey too. Survey related information, including case ID, user ID, survey results, any user input, and event info, may be sent to server 82 by processor 16 via network 14. Server 82 may, for instance, store case ID, survey results, user input, and event info in survey database 12, and keep user ID and case ID in log database 20. Alternatively, survey related information may be transmitted to a local device which in turn may relay the information to a remote server. Additionally, processor 16 may send survey related information to a local device which may pass it to a local database. For instance, a shop owner may want to keep a copy of survey data collected from customers, and conduct own customer research and analysis.

The wait stage in Step 150 may be initiated by clicking or tapping a "Wait" button 90 on surface 36 and may last for some time which may be set up by a user. For instance, after a user makes a payment at a store, the user may have to wait for his order (such as waiting in line for a burger or drink), or may have hands full, thus the user may want to delay a survey until a shopping process is concluded or when it's more convenient to do so. There is also a "Shrink" button 92 located between buttons 90 and 33. Clicking or tapping button 92 causes shrinkage of survey window and suspension of survey process, which may turn the window into a small graphic icon or send the session to an alert list. The suspended process may be resumed when being activated through clicking or tapping the shrunk icon or a corresponding item on the alert list.

The single-action survey window of FIG. 3 may also contain other functions on the GUI. For example, there may be a message 31 assuring users the survey window will close by itself shortly, say in ten seconds. In order to reduce intrusiveness, the window should be closed automatically when a user is busy with other things or ignores the survey. And the window should be closed quickly, such as within a period from a couple of seconds to a minute. Although most people would like to do single-action survey, there are some people who nonetheless want to spend time to provide more information regarding customer experience and feeling. Thus, the GUI or surface 36 may also include a "Regular Survey" object 34 to provide an opportunity for users to take a regular or traditional survey that has multiple questions. Once object 34 is selected, a window of regular survey may show up on the GUI, signaling a new session.

Figure 4:
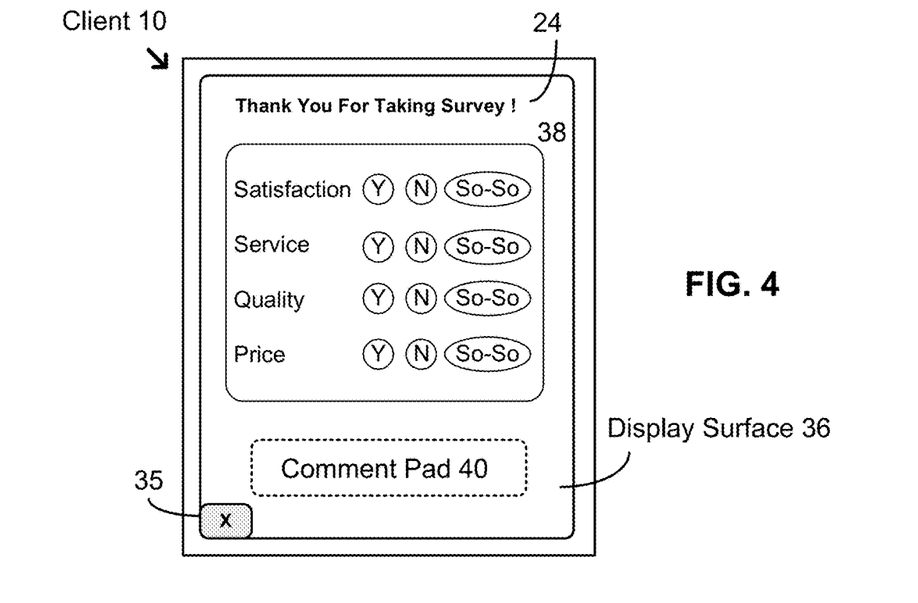

FIG. 4 shows an exemplary embodiment of regular survey in accordance with the present invention. The GUI in FIG. 4 may be generated after a user chooses to take a regular survey by clicking or tapping graphic object or button 34 of FIG. 3. Below a "Thank You" message 24, there is an area 38 containing multiple exemplary questions, such as opinions on satisfaction, service, quality, price, etc. More questions and/or more pages may be arranged for a regular survey. At the bottom of the GUI, a comment pad 40 may be provided for users to express more on their experience by writing essays or any comments. Once pad 40 is clicked, a workspace may be generated, where a user may leave comments, suggestions, or wishes. The workspace is not shown in FIG. 4 for brevity reasons.

Figure 5:
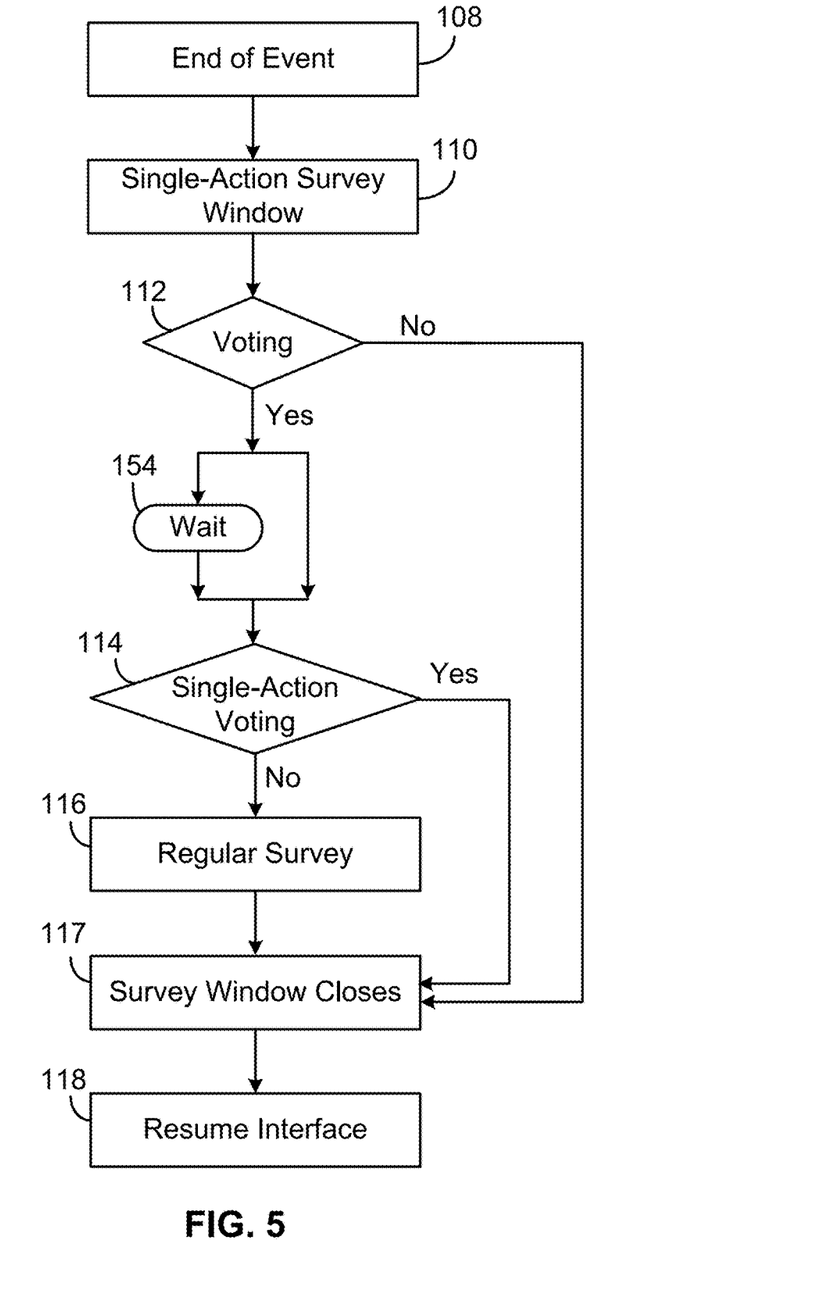
FIGS. 5 and 6 are flow diagrams depicting surveys having single-action features in accordance with the present invention.

FIG. 5 is a schematic flow diagram of one embodiment having both single-action and regular survey options. It starts with Step 108, the end of an event. Next a single-action survey window shows up in Step 110. A user can choose whether or not to participate in a survey in Step 112. If the answer is no, the user may use a single click or single tap to close the survey window (e.g., selecting a "Close" button), or ignore the survey by doing nothing, which prompts Step 117, closure of the survey window. If the user wants to take the survey, he or she may either take Step 154 to wait for a certain period of time, or go to a survey session directly. In the latter case, he or she may make another decision in Step 114. If a single-action survey is preferred, one question is asked. Answering the single question leads to Step 117, closing the survey window. On the other hand, a user may also choose a regular survey and enter Step 116, where multiple questions are presented, as well as a platform for taking user comments, which is followed by window closing Step 117. Finally in Step 118, the GUI may resume its original state or start a new session. Back to Step 154, once a waiting period comes to an end, either automatically or initiated by user, the user may start from Step 114 and proceed to reach Step 118 as discussed before. The length of wait time may be selected or arranged by user. A wait process may be interrupted by a user at any time. During wait time, a survey window may stay or be closed temporarily, depending on design and arrangements.

Figure 6:
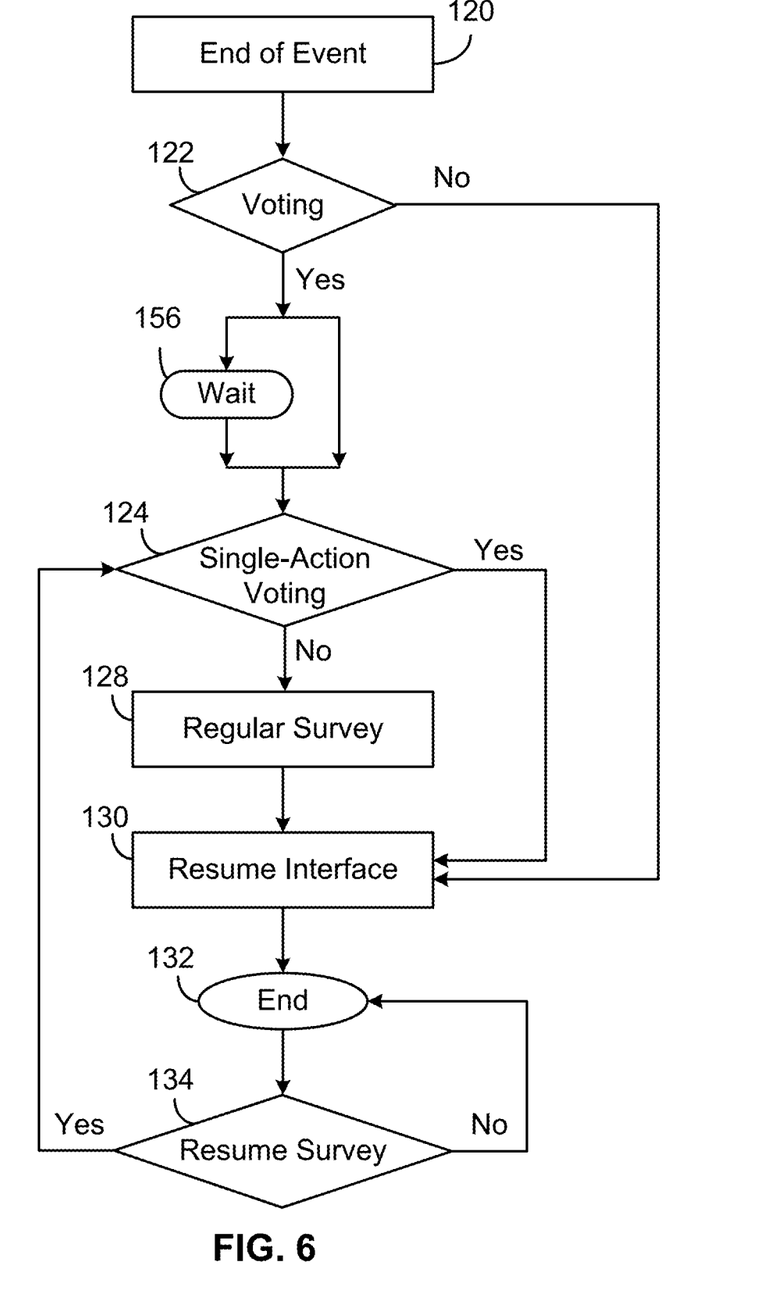

FIG. 6 shows a schematic flow diagram of another embodiment in accordance with the present invention. Like the flow diagram of FIG. 5, the process begins with the end of an event in Step 120. Next, a survey window opens (not shown in the figure for simplicity reasons). If a user doesn't want to take part in the survey in Step 122, the window closes with a single action or no action, and the GUI returns to its previous setting in Step 130. If a user participates in the survey, two options are presented: To proceed with the flow or to wait for a while. In the former situation, a single-action voting may take place in Step 124, and the original GUI resumes in Step 130 after the survey window closes. Additionally, a user may choose to pass the single-action voting, and go to a regular survey session in Step 128, where the user may answer questions and/or post comments. After that, the GUI resumes in Step 130. When a user chooses to wait in Step 156, the survey process is postponed. The delayed process may resume automatically or get restarted by user's instruction. Once a survey session returns, it may begin from Step 124 and continue as the diagram describes.

Returning to the previous interface or GUI before survey session may also mean Step 132, the end of survey. However every now and then in real life, users may want to take part in a skipped survey, adjust their submitted survey answers, add a comment, or rewrite a posted essay. To satisfy such demands, a client system may provide an option or application which allows a user to redo a survey or take a survey session which was missed in the past. In Step 134, a user may decide whether or not to go back to a survey. Going back means returning to Step 124 with a GUI displaying a single-action survey window, where there are options for single-action and regular surveys. Referring to FIG. 1, in order to resume a survey, client 80 may send to server 82 a request, plus customer's user ID and case ID. Server 82 may verify the ID information based on the data stored at log database 20, locate corresponding survey result at database 12 according to the ID info, and then send instructions and data to client 80. Once the user redoes the survey, results are transmitted to server 82. Then database 20 and 12 are updated using the new results. It may be designed such that a user may change survey results multiple times within a certain time frame.

Figure 7:
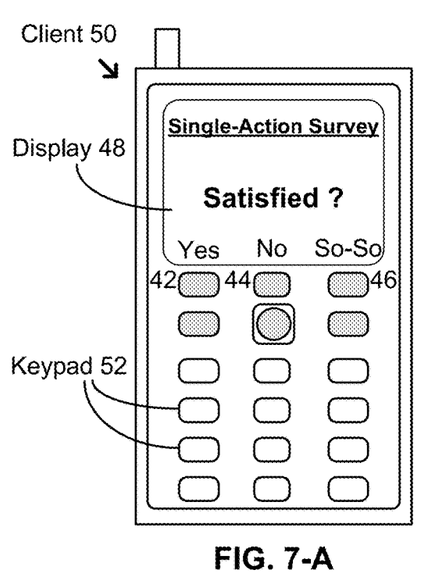

FIGS. 7-A and 7-B show exemplarily two diagrams of one embodiment. In FIG. 7-A, a client system 50 may be a mobile phone equipped with a keypad 52 and a display 48. Display 48 may not have a touch-sensitive screen, i.e., the display is for showing information and graphical objects only. In the figure, display 48 features a title "Single-Action Survey" and a survey subject "Satisfied?" at the end of an event. In real applications, the title may show store or event name to identify a survey target. In this design, the three answers "Yes", "No", and "So-So" cannot be selected either by touching or clicking. Instead, a survey answer may be chosen by pushing buttons 42, 44, or 46 individually. Again, after single-action selection, display 48 returns to a previous setting. Therefore, it is still a single-action survey. The survey program may be embedded in a processor system of client 50; alternatively, it may also be installed as a specific application which may be downloaded from the Internet. Once a survey is concluded, survey related information may be transmitted by the client processor to a local device, which then forwards it to a local or remote survey database, or to a remote database directly via communication networks.

FIG. 7-B depicts schematically another scenario of the embodiment. If no action is received within a given period of time after the survey window shows up, the survey question may be changed to "Do Survey?". Buttons 42, 44, and 46 now represent Yes, Wait, and No respectively. Answer "Yes" implies a user would like to do the survey, and then the original survey window may return; "No" means a user doesn't want to do it, and thus the window resume the previous setting; and "Wait" means a user needs more time before starting a survey. If a certain period of time elapses without receiving any action from a user, the survey process may end automatically and the GUI in FIG. 7-B may go back to the previous configuration.

Figure 8:
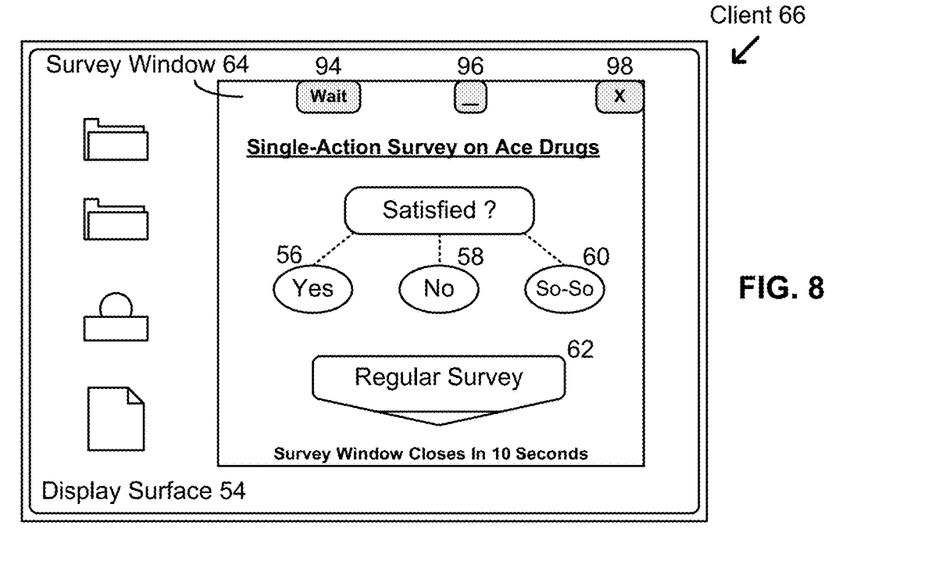

FIG. 8 is a graphic illustration of yet another embodiment in accordance with the present invention. A client system 66 may represent a smartphone, tablet computer, laptop computer, or desktop computer. A survey window 64 may show up after a purchase which is titled "Single-Action Survey on Ace Drugs". The window only takes part of a display surface 54 with file and program icons in the background. Surface 54 may be touch-sensitive. Graphic objects 56, 58, or 60, as the three answers of single-action survey, may be selected by a mouse click, a finger tap, or another simple and easy action. Alternatively, a user may choose to take a regular survey by clicking or tapping object 62. The survey process and client device functions may be similar to those introduced in the flow diagrams of FIGS. 5 and 6. In addition, a user may click or tap graphic button 94, 96, or 98 to keep window 64 staying longer for certain time, shrink the window, or close it respectively.

Figure 9:
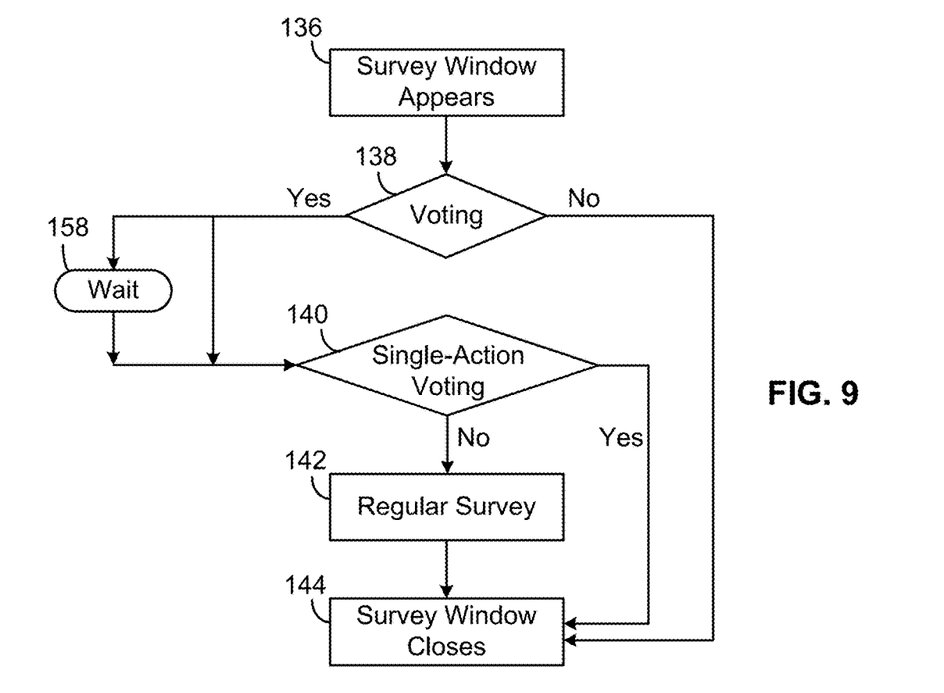
FIG. 9 is a flow diagram showing single-action survey of one embodiment in accordance with the present invention.

A survey implemented immediately after an event makes it natural and relevant. But some surveys are desirable before an event happens. Examples of this type include survey on social or political issues before election, product surveys before release, surveys on future trends, and so on. Thus for certain subjects, a survey request may be presented to users before an event takes place. A surveyee may be randomly chosen in some cases, when there is no exact information about who is more relevant to an event. Starting time of some surveys may also be randomly arranged within a time frame. In such cases, the first survey step may be to create a survey window or start it audibly when there is no display in a client system. FIG. 9 illustrates schematically a flow diagram of one embodiment for such circumstances. Steps 136, 138, 158, 140, 142, and 144 exemplarily depict a survey process involving single-action survey and regular survey, which may be similar to that shown in FIG. 5 except the start part. Thus the client processor system and other components here may have similar configurations and functions to the aforementioned for other embodiments discussed. In Step 136, a survey gets started with displaying a survey window. A user may decide to do it or not in Step 138. If the invitation is rejected, the survey window closes in Step 144. If the user agrees to participate in it, he or she may want to wait for some time in Step 158, or go directly to Step 140, where the next decision is whether to do single-action survey. Choosing single-action survey means Step 144 after performing one action. Otherwise, a regular survey begins in Step 142 before the end of the process.

Figure 10:
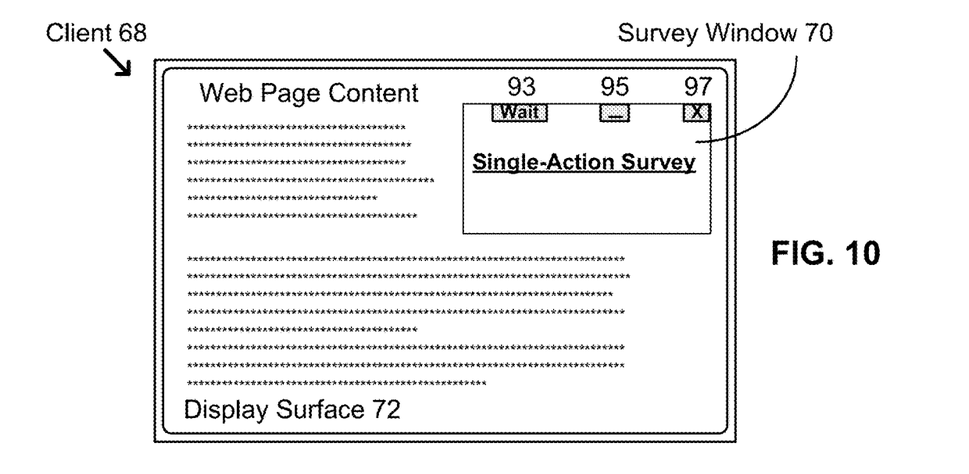
FIGS. 10, 11, and 12 are illustrations of three embodiments in accordance with the present invention.

FIG. 10 shows an illustration of one embodiment of single-action survey regarding the scenario of FIG. 9. A browser component of a client system 68 may display online contents on a GUI or display surface 72. As pre-scheduled, a single-action survey window 70 appears. The popped up window may be arranged so that its appearance doesn't affect the view of online contents if possible. The survey window may temporarily take an empty space or ad space on surface 72. After a single-action selection is taken, the survey window may close, and previous contents or new contents may show up. As in aforementioned cases, wait, shrink, and close functions may be arranged using buttons 93, 95, and 97. If no action is detected in a given period of time, which may be sufficiently short, survey window 70 may close by itself. Client 68 may be a smart phone, a tablet computer, a desktop computer, or other electronic gadgets or computing devices. The embodiments of FIGS. 9 and 10 may be useful for collecting opinions on a popular event or phenomenon, certain governmental policy, or any other issues involving the general public or a community.

Figure 11:
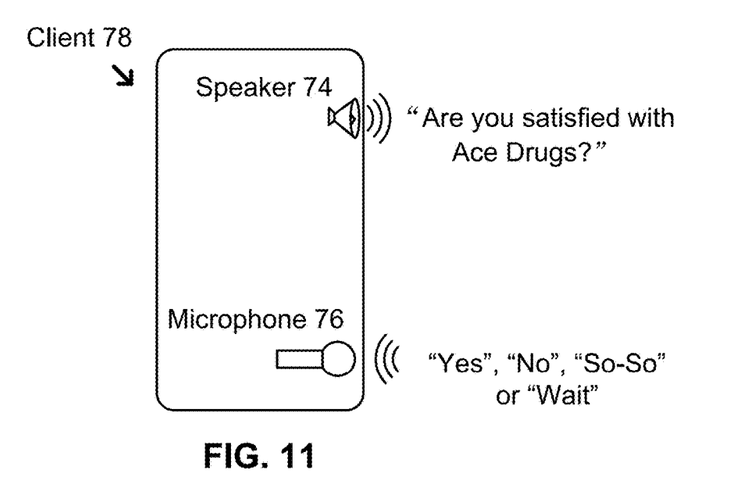

FIG. 11 illustrates an exemplary diagram of yet another embodiment in accordance with the present invention. A client system 78 may include a speaker component 74 and a microphone component 76. Speaker 74 may start a survey by producing an audible question regarding an event, like "Are you satisfied with Ace Drugs?" after a transaction is completed. A user may speak to microphone 76, for instance, "Yes", "No", or "So-So", as an answer. Depending on the system configuration, other words may also be used as a survey answer, such as "Excellent", "Good", "Very good", "Not bad", "Bad", and so on. The one-word or short-sentence speech may be considered as a single-action reply, which causes ending of the survey. The user may also say "Wait" to get extra time before releasing survey answer. As in other embodiments, a survey may end if no eligible audible reply is detected. At the end of a survey, client 78 may resume its previous operation status or return to a predetermined setting. Moreover, client 78 may be configured such that if a user answers "Regular survey", a survey with multiple questions may begin. Thus it is yet another embodiment of single-action survey which has an option to do regular survey. However, unlike aforementioned cases, client 78 may not need a display, because a survey may be carried out audibly through exchange of sound and voice. Client 78 may be an electronic device which has a processor system, machine readable memory medium, stored executable instructions (e.g., programs and applications) like client 80 of FIG. 1. Because display is not involved, Client 78 may eliminate a bulky display component as well as graphic processing related software and hardware. Client 78 may even eliminate mobile phone components, if wireless vocal communication is not in need. The client system may have functions which include starting a survey at the end of a target event or after receiving an instruction, concluding a survey when receiving a single-action or getting no action, and resuming client's previous operation setting after a survey. Like client 80, the client system may carry out wired and/or wireless data communication with a local or remote device, and may also do other tasks like electronic payment transactions which may be desirable by shoppers, besides its speech recognition and voice generation capability. Client 78 may be supported by embedded programs and/or installed applications. Since there is no display, client 78 may be made substantially small in size and economic in cost for various mobile and/or disposable uses. For example, the processor system and other components of client 78 may be integrated into a few chips or even one chip, potentially suitable for mass production using semiconductor fabrication technologies.

Figure 12:
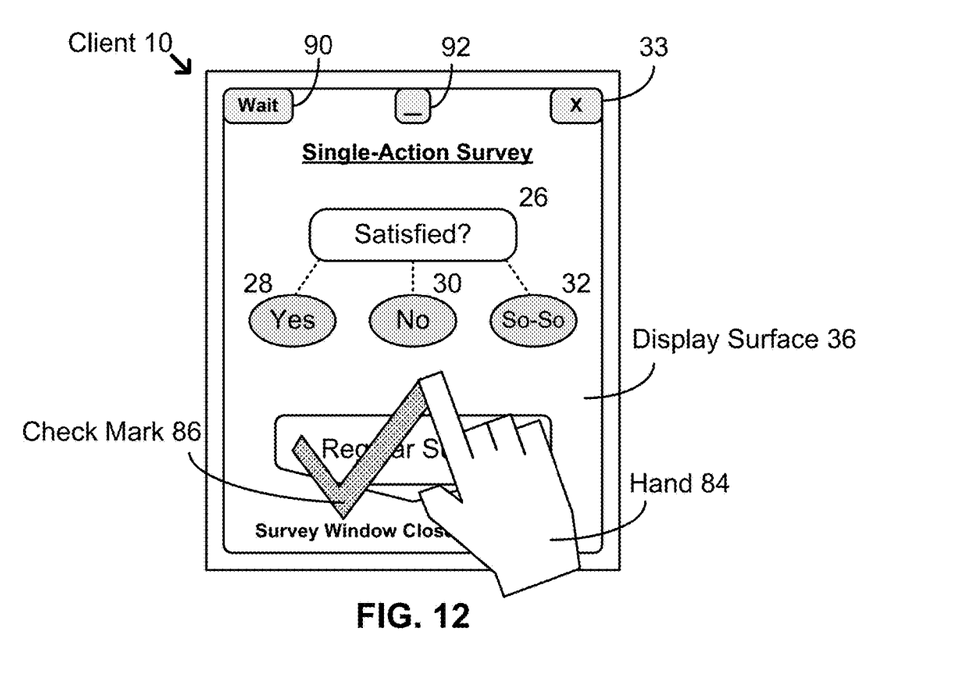

FIG. 12 is an illustration of one embodiment which provides flexibility and additional convenience for single-action response in a survey. Back to FIG. 3, a single-action voting may be performed by tapping button 28, 30 or 32 with a finger when display surface 36 is touch sensitive. In the process, a user has to make sure his or her finger tip aims at the right place or object, which may be burdensome when the user is on the run. As surface 36 is sensitive to touches, a contact detection module may be incorporated with client 10 that may detect not only a single touch or multiple touches, but also finger movement and trajectory on surface 36. As well known in the art, contact detection technologies may include capacitive, resistive, infrared, optical, surface acoustic wave, proximity sensing methods, etc. A proximity sensor array may also be employed to detect gestures of a finger or fingers above a screen surface. Returning to FIG. 12, the embodiment is still illustrated by client 10 with the same configuration as in FIG. 3. Assume client 10 is now equipped with contact sensing technologies and is able to detect finger touch, finger gesture, trajectory, or finger motion on surface 36. For example, when a check mark 86 is created by a hand 84 on the screen, client 10 may sense that a check-mark shaped object is drawn through suitable algorithms. Thus a user may set up a program or install an application which may recognize certain finger movements or gestures and take them as yes, no, or so-so respectively. For instance, a scribble making a check mark on surface 36 may be designated as yes (as shown in FIG. 12), a cross as no, a straight stroke as so-so, and a circle as wait (the latter three are not shown for simplicity reasons). Thus a user may finish a survey session by a quick scribble on the screen, which may be done easily and fast without paying much attention to the location his or her finger lands on over there. Therefore a single-action survey may become more convenient and more likely to be accepted.

Figure 13:
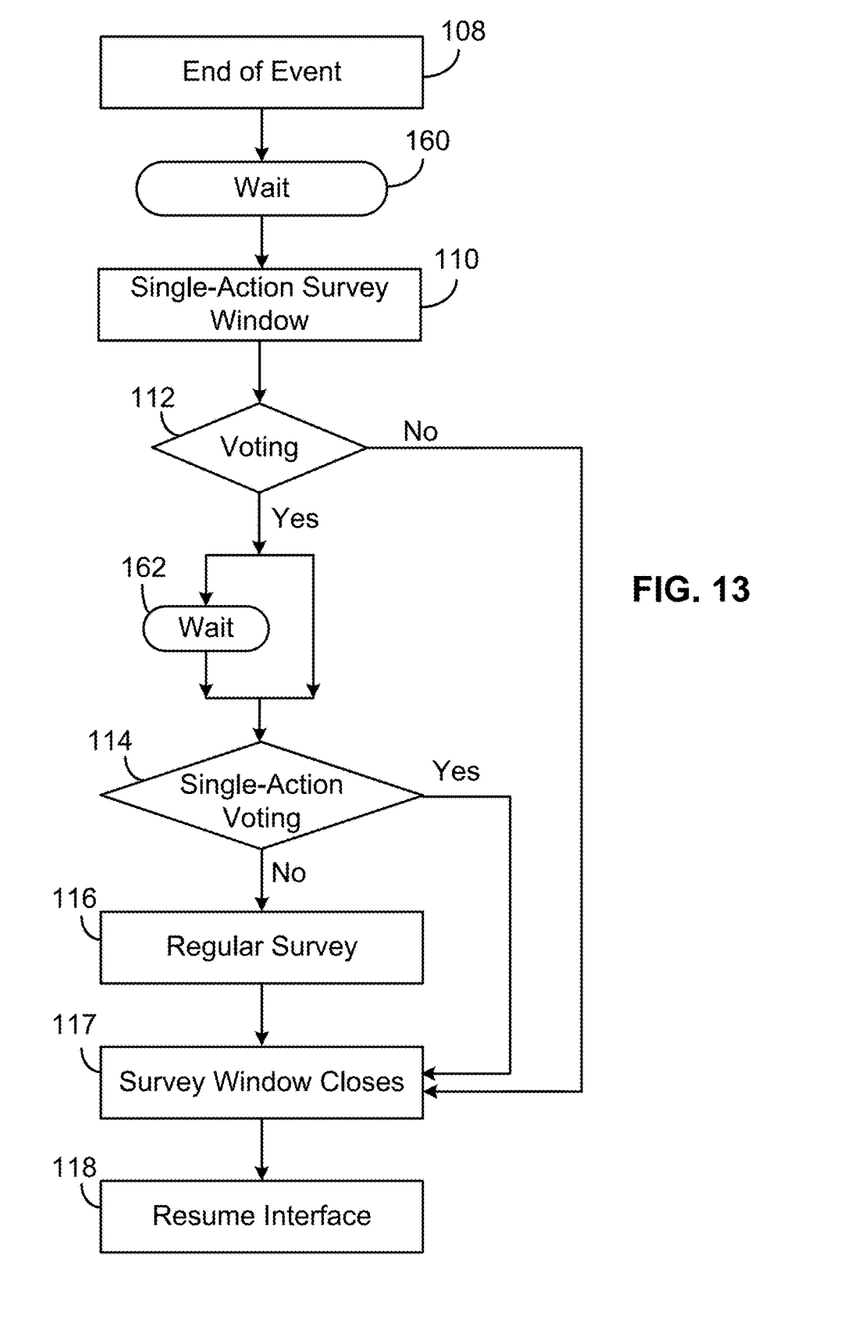
FIG. 13 is a flow diagram showing single-action survey of one embodiment in accordance with the present invention.

FIG. 13 shows a schematic flow diagram which is a modification of the embodiment depicted in FIG. 5. The main change is reflected by an added Step 160, a wait process, which may be used to delay Step 110, starting a single-action survey. The wait is desirable for certain applications. For instance, after an event ends, some users may not be ready to go through a survey. When in a shopping mall, a user may be busy with his or her shopping agenda or have hands full; or when purchasing a product at a store, a user may make a payment without taking out a smartphone. In the latter case, as the phone may be inside a pocket or bag, it is inconvenient and impractical to begin a survey which may rely on a phone screen. Thus, a survey session better be arranged to show up at a later time. The delay length may be determined by users on a category by category basis. To illustrate this change, Step 160 is inserted between Step 108 and 110, as depicted graphically in FIG. 13. Step 160 means there is a time delay before Step 110 takes place, or a survey window may occur at a predetermined time after an event is completed. This delay function may be applied to other embodiments discussed in the above. Once Step 110 gets started, the process may run through Step 112, 117, 118, and maybe through Step 162, 114, or 116 as well, which is the same as the process illustrated in FIG. 5 and discussed accordingly.

Moreover, after an event, a single-action survey window may appear either on a device which a user uses or carries in the event, or on a device located at home or office. The place and timing of survey window appearance may be decided by a user in advance. For instance, a survey window may be arranged on a home computer or office computer, so that a user may complete it after things are settled down. Doing survey at home may be especially preferred by users busy in day time, even though a survey requires only a single action.

Figure 14:
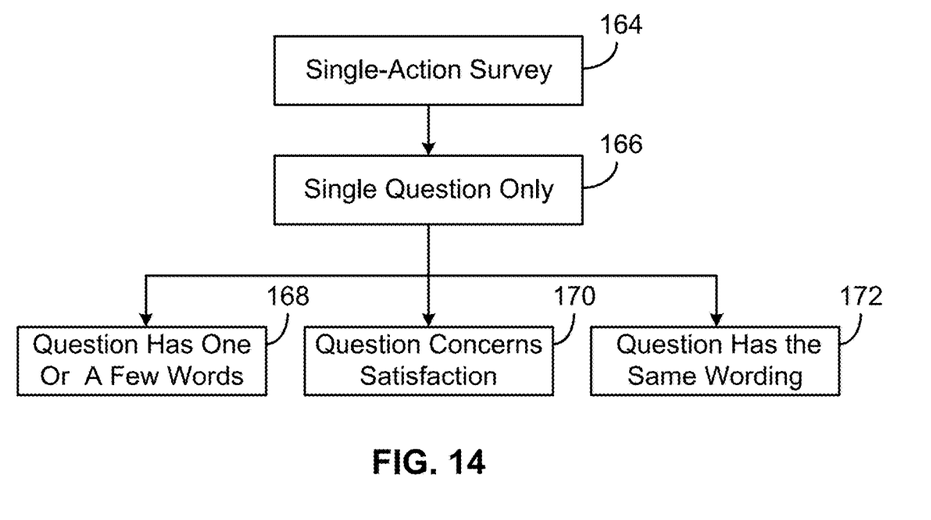
FIG. 14 uses exemplary diagram to depict survey method and survey contents in accordance with the present invention.

Referring to FIG. 14 which describes schematic methods to do a survey and exemplary survey content. Schemes to be described may apply to survey cases discussed in the above. As aforementioned, single-action survey may be suitable for a wide range of activities, such as online shopping, in-store shopping, dining, service, gaming, entertainment, sports, community activity, political gathering, and so on. When single-action survey is utilized for various events with far different features, not only survey procedures but also survey contents are simplified. For instance as in the figure, when a single-action survey is conducted in Step 164, it may be designed that only a single question will be presented in Step 166. Thus for different events or even far different events, there may be only one question arranged in front of a user when a survey is carried out. It is noted that single-question format doesn't exclude other options. Like shown in FIG. 3, a survey interface may display a single question plus other options such as button 34 which represents a chance to do a regular survey.

For a quick and easy survey, a single survey question should be simple, short, and easy to understand. Exemplary single question may include "Satisfied?", "Are you satisfied?", "Are you satisfied with Shop A?" or another short and easy-to-understand sentence. There are at least three types of single survey question.

In Step 168, a single survey question may be designed to have one or a few words only, like "Satisfied?" or other examples just mentioned. Thus a survey may be arranged to have a single question and the single question may contain a few words or even one word only. For instance, a single question may have at most seven words. Such a survey question may be arranged and suitable for different or even far different events, such as dining, shopping, auto repair, and ball games.

In Step 170, a single survey question may be designed to be related to user satisfaction, like "Satisfied?" and "Are you satisfied?" which are suitable for different or even far different events as well. So, when multiple surveys are conducted, the single question for each survey may focus on the same subject that is whether a user feels satisfied, regardless of how different the events are. In a sense, for this type of single question, question wording may change from one event to another; but its objective remains the same, i.e., to find out whether a user is satisfied regarding an event or experience. In other words, a single question may be always related to user satisfaction for a wide range of events.

Step 172 introduces the third type of single question. As a single question may be so simple and short while appropriate for different events, it may naturally address a general or universal issue. Thus, a single question may be created such that it may use the same wording repeatedly in many occasions for various events. It's obvious that exemplary question like "Satisfied?" or "Are you satisfied?" fits the feature of this type. Such questions may be used repeatedly with the same wording for many events and many occasions, or the same wording of survey question may be used in surveys arranged for different or even far different events. Since sometimes survey questions may be written as "Satisfied with Shop A?" and "Satisfied with Shop B?", the third type of survey question may be modified as a question with the same wording except name of survey target. Again, the modified survey question may be suitable and arranged for different or even far different events.

CONCLUSION, RAMIFICATIONS, AND SCOPE

Thus it can be seen that systems and methods are introduced to generate improved surveys.

The improved survey has the following features and advantages:
(1). Only a single action is needed to conclude a survey;
(2). A single action may include one touch, tap, stroke, click, motion, short verbal input, or another simple one-step move;
(3). A single-action survey may be arranged flexibly within a time frame around or after event time; and
(4). A survey may have a single question only, where the single question may be arranged related to user satisfaction and/or have one or a few words.

Although the description above contains many specificities, these should not be construed as limiting the scope of the invention but as merely providing illustrations of some of the presently preferred embodiments. Numerous modifications will be obvious to those skilled in the art.

Ramifications:

Speech recognition and voice generation functions introduced in FIG. 11 may be incorporated with other embodiments involving finger moves to take advantage of both audio style and touch screen methods. For example, a survey may start with a voice (like "Are you satisfied with Ace Drugs?") and end with a scribbled check mark on a screen, or start with a survey window on a screen and end with a vocal reply "Yes", "No", "So-So", or "Wait". Or a user may switch between audio mode and screen mode depending on different occasions.

Referring to the embodiment shown in FIG. 12, more finger movements may be utilized to signal single-action answers. For example, tapping using one finger, two fingers, or three fingers may represent three answers yes, no, or so-so; or touching or tapping on upper, middle and lower section of the screen may reflect the three answers respectively. Besides maneuvers by fingers, as known in the art, movement of hand on a touch screen may also be sensed and thus may be utilized as a single-action response. For example, a single action may be a touch, tap, or slide by hand.

Furthermore, a motion sensing component such as accelerometer and/or gyroscope may be added to a client system which senses motion of the client device. For example, shaking or waving a mobile phone in vertical direction, horizontal direction, or in circle may respectively represent the three answers of single-action survey.

For mobile phone users, the launch of a survey may feature flashes of light from an embedded light emitting module, so that a user may not need to look at the screen closely to know a survey has started after a target event is over. This feature, when combined with other easy steps, makes a survey even more convenient. Flashing lights may also be used to remind a user of that a survey is in wait period.

The process described in the flow diagram of FIG. 13 is also applicable when a user makes payment using credit card at a store. Assume a cell phone or home computer is registered with the credit card. Then, a survey window may be configured to show up on the phone screen or computer monitor afterwards. When and where a survey window appears may be set up by a user.

In FIGS. 2, 5, 6, and 13, the first step may also represent the beginning of an occasion, particularly in cases where multiple surveys are arranged for a big event which may contain several sessions, like concert, ball game, cruise, etc. When a survey starts at an early stage, survey results may cover feedback up to that point, thus producing more details.

Lastly, when a device is equipped with proximity sensor or three-dimensional (3-D) gesture sensor, it may detect finger or hand position at a short distance away from it. Thus finger and hand gesture and movement in the air may be used to complete a single action survey, too. Examples may include a check mark, circle, and straight line for the three answers created by finger or hand in the air, preferably close to a screen of the device.

Therefore the scope of the invention should be determined by the appended claims and their legal equivalents, rather than by the examples given.

The invention claimed is:

1. A system arranged for working with a plurality of apparatuses having stored executable instructions, comprising:
   A) a communication program for enabling communication between the system and a survey facility via an electronic device or a communication network;
   B) a survey program for arranging a plurality of survey sessions respectively, wherein the plurality of survey sessions are configured for different events and a single survey question is presented for each of the plurality of survey sessions;
   C) the survey program arranged such that the single survey question is related to user satisfaction and has no more than three words;
   D) the survey program arranged such that reception of response to the single survey question from a user causes closing of a corresponding survey session automatically; and
   E) the system arranged such that survey results are transmitted to the survey facility via the electronic device or the communication network.

2. The system according to claim 1 wherein one of the plurality of survey sessions closes automatically in a given period of time in the absence of user response.

3. The system according to claim 1 wherein the survey program provides an option to extend time period of one of the plurality of survey sessions.

4. The system according to claim 1 wherein the single survey question is arranged to have the same wording for different events and occasions.

5. The system according to claim 1 wherein the survey program provides a working space for the user to enter own words.

6. The system according to claim 1, further including an interactive program, wherein the interactive program provides an option to do a survey having multiple survey questions.

7. The system according to claim 1, further including a mechanism to detect a verbal message or a pattern produced on a display screen and use the verbal message or pattern as a response to the single question.

8. A computer implemented method performed for conducting a plurality of survey sessions arranged for different events, comprising:
 A) launching the plurality of survey sessions respectively;
 B) presenting a single survey question for each of the plurality of survey sessions;
 C) the method arranged such that the single survey question is related to user satisfaction and has no more than three words;
 D) concluding a corresponding survey session automatically after receiving a user response to the single question; and
 E) transmitting survey results to a survey facility via an electronic device or a communication network.

9. The method according to claim 8, further including closing one of the plurality of survey sessions automatically in a given period of time in the absence of user response.

10. The method according to claim 8, further including providing an option to extend time period of one of the plurality of survey sessions.

11. The method according to claim 8 wherein the single survey question is arranged to have the same wording for different events and occasions.

12. The method according to claim 8, further including providing a working space for a user to enter own words.

13. The method according to claim 8, further including providing an interactive program, wherein the interactive program provides an option to do a survey having multiple survey questions.

14. The method according to claim 8, further including detecting a verbal message or a pattern produced on a display screen and using the verbal message or pattern as a response to the single question.

15. A computer implemented method performed for conducting a plurality of survey sessions arranged for different events, comprising:
 A) launching the plurality of survey sessions respectively;
 B) presenting a single survey question for each of the plurality of survey sessions;
 C) the method arranged such that the single survey question is arranged to have the same wording and no more than three words;
 D) concluding a corresponding survey session automatically after receiving a user response to the single question; and
 E) transmitting survey results to a survey facility via an electronic device or a communication network.

16. The method according to claim 15, further including closing one of the plurality of survey sessions automatically in a given period of time in the absence of user response.

17. The method according to claim 15 wherein the single survey question is related to user satisfaction.

18. The method according to claim 15, further including providing an option to extend time period of one of the plurality of survey sessions.

19. The method according to claim 15, further including providing a working space for a user to enter own words.

20. The method according to claim 15, further including providing an interactive program, wherein the interactive program provides an option to do a survey having multiple survey questions.

* * * * *